(12) United States Patent
Herrera

(10) Patent No.: US 11,261,980 B2
(45) Date of Patent: Mar. 1, 2022

(54) APPARATUS AND METHOD FOR ACTIVATION OF FLAPPER CHECK VALVE

(71) Applicant: COIL SOLUTIONS INC., Alice, TX (US)

(72) Inventor: Michael Herrera, Alice, TX (US)

(73) Assignee: Coil Solutions, Inc., Alice, TX (US)

( * ) Notice: Subject to any disclaimer, the term of this patent is extended or adjusted under 35 U.S.C. 154(b) by 0 days.

(21) Appl. No.: 17/249,785

(22) Filed: Mar. 12, 2021

(65) Prior Publication Data

US 2021/0285555 A1   Sep. 16, 2021

Related U.S. Application Data

(60) Provisional application No. 62/988,774, filed on Mar. 12, 2020.

(51) Int. Cl.
*F16K 15/03* (2006.01)

(52) U.S. Cl.
CPC ....... *F16K 15/033* (2013.01); *Y10T 137/7902* (2015.04)

(58) Field of Classification Search
CPC .................. F16K 15/033; Y10T 137/7902
See application file for complete search history.

(56) References Cited

U.S. PATENT DOCUMENTS

| | | | | |
|---|---|---|---|---|
| 1,670,519 A | * | 5/1928 | Pekrul | F16K 15/03 405/100 |
| 1,837,658 A | * | 12/1931 | Force | F16K 15/03 137/527.6 |
| 1,871,536 A | * | 8/1932 | Le Bus | E21B 21/10 137/515 |
| 1,929,527 A | * | 10/1933 | Treverton | E02B 13/02 137/527.6 |
| 3,006,596 A | * | 10/1961 | Nelson | F16K 1/2007 251/33 |
| 3,283,778 A | * | 11/1966 | Linna | F16K 15/00 137/512.3 |
| 3,334,858 A | * | 8/1967 | Hay | F16K 1/2007 251/82 |
| 3,478,778 A | * | 11/1969 | Clarkson | F16K 15/00 137/527.4 |
| 3,482,603 A | * | 12/1969 | Outcalt | E21B 34/08 137/515.5 |
| 3,713,485 A | * | 1/1973 | Holbert, Jr. | E21B 34/02 166/321 |

(Continued)

FOREIGN PATENT DOCUMENTS

GB   532241 A   *   1/1941   ........... F16K 15/033

*Primary Examiner* — Craig M Schneider
*Assistant Examiner* — Frederick D Soski
(74) *Attorney, Agent, or Firm* — Ramey and Schwaller, LLP

(57) ABSTRACT

A flapper check valve employed to prevent flow up the work string while allowing flow down the work string and into the well is disclosed. The check valve is activated by a compression spring, which then acts on a ball which will further act on a cam profile attached to the back of a flapper. The apparatus causes the flapper to default to the closed position when the flow is stopped, regardless of the position of the valve, even when gravity is acting against the flapper. The compression spring also allows for an apparatus which possesses lower operating stresses on the spring.

4 Claims, 5 Drawing Sheets

(56) References Cited

U.S. PATENT DOCUMENTS

| | | | | |
|---|---|---|---|---|
| 3,789,874 A * | 2/1974 | Hills | ............ | F16K 1/24 137/527 |
| 3,817,278 A * | 6/1974 | Elliott | ............ | F16K 37/0008 137/527 |
| 3,996,962 A * | 12/1976 | Sutherland | ............ | E03C 1/106 137/527.4 |
| 4,188,973 A * | 2/1980 | Weise | ............ | F16K 15/033 137/514 |
| 4,495,859 A * | 1/1985 | Janke | ............ | F01N 13/085 137/514 |
| 4,669,500 A * | 6/1987 | Strelow | ............ | F16K 15/03 137/514 |
| 4,706,706 A * | 11/1987 | Page | ............ | F16K 15/1821 137/527.8 |
| 4,989,635 A * | 2/1991 | Dunmire | ............ | F16K 15/033 137/512 |
| 5,072,753 A * | 12/1991 | Ackroyd | ............ | E03C 1/104 137/527 |
| 5,159,981 A * | 11/1992 | Le | ............ | E21B 34/06 166/325 |
| 5,176,172 A * | 1/1993 | Ackroyd | ............ | E03C 1/104 137/527 |
| 5,327,933 A * | 7/1994 | Ishikawa | ............ | B60K 15/04 137/527.6 |
| 5,503,176 A * | 4/1996 | Dunmire | ............ | E03C 1/106 137/15.01 |
| 5,711,341 A * | 1/1998 | Funderburk | ............ | F16K 15/033 137/454.6 |
| 5,794,655 A * | 8/1998 | Funderburk | ............ | F16K 15/033 137/454.6 |
| 6,227,299 B1 * | 5/2001 | Dennistoun | ............ | E21B 34/10 166/332.8 |
| 6,343,618 B1 * | 2/2002 | Britt | ............ | F16K 15/035 137/527 |
| 6,736,160 B2 * | 5/2004 | Nagai | ............ | F01N 1/165 137/527 |
| 6,877,564 B2 * | 4/2005 | Layton | ............ | F16K 31/54 166/332.8 |
| 6,932,100 B2 * | 8/2005 | Martin | ............ | F16K 15/033 137/15.18 |
| 7,021,386 B2 * | 4/2006 | Vick, Jr | ............ | F16K 15/033 166/332.8 |
| 7,255,173 B2 * | 8/2007 | Hosie | ............ | E21B 34/06 166/332.8 |
| 7,708,066 B2 * | 5/2010 | Frazier | ............ | E21B 34/14 166/250.08 |
| 8,261,836 B2 * | 9/2012 | Noske | ............ | E21B 34/14 166/332.8 |
| 8,689,893 B2 * | 4/2014 | Soltvedt | ............ | E21B 21/106 166/386 |
| 8,870,493 B2 * | 10/2014 | Haire | ............ | E01F 5/005 405/125 |
| 10,662,740 B2 * | 5/2020 | Cannon | ............ | E21B 33/068 |
| 2003/0121665 A1 * | 7/2003 | Trott | ............ | E21B 34/10 166/332.8 |
| 2003/0168105 A1 * | 9/2003 | Funderburk | ............ | F16K 15/035 137/527.2 |

* cited by examiner

APPARATUS AND METHOD FOR ACTIVATION OF FLAPPER CHECK VALVE

CROSS-REFERENCE TO RELATED APPLICATIONS

This application claims the benefit of U.S. Provisional Patent Application 62/988,774 filed on Mar. 12, 2020; which is specifically incorporated by reference in its entirety herein.

FIELD

The disclosure relates generally to the oil and gas industry. The disclosure relates specifically to check valves.

BACKGROUND

In the oil and gas industry, it is common to use an apparatus to prevent the flow of fluids in one direction of a work string. A work string is typically utilized for well drilling, workover, or coiled tubing intervention. In many of these work string applications, a check valve can be used as a precautionary measure in case of a work string failure or be a vital part of the operation. In most cases, it is desirable for the check valve to prevent flow up the work string, but allow flow to down the work string, through the check valve and into the well.

The current industry standard is typically a torsion spring. Due to design constraints and the required deflection of the spring, the torsion spring is usually overstressed and limited to a small number of cycles before failure. This results in the torsion spring breaking, resulting in a loss of function for the valve. In this case it is no longer guaranteed that the check valve will prevent flow in the opposite direction. It would be advantageous to have a check valve that is not as susceptible to loss of function.

SUMMARY

An embodiment of the disclosure is a flapper check valve apparatus comprising: a tubular body; a flapper with an ability to pivotally move around the tubular body; and an elastic actuator adjacent to the flapper; wherein the flapper is activated by the compressed elastic actuator, which has an ability to bias the flapper into a closed position when a flow is stopped. In an embodiment, the tubular body comprises a radially outwardly extending annular valve seat formed thereon. In an embodiment, the annular valve seat comprises a cavity being parallel to an axis of the tubular body to accommodate the elastic actuator. In an embodiment, the flapper comprises a cam having a cam profile. In an embodiment, the apparatus further comprises a hinge pin placed through the cam. In an embodiment, the annular valve seat comprises two ears to couple the hinge pin. In an embodiment, the elastic actuator urges the cam to bias the flapper from an open position into the close position. In an embodiment, when the flapper is in the closed position, the elastic actuator contacts the cam profile at a first point, with the radius of the first point the smallest radius on the cam profile. In an embodiment, when the flapper is in the open position, the elastic actuator contacts the cam profile at a second point, with the radius of the second point the largest radius on the cam profile. In an embodiment, radii on the cam profile from the first point to the second point are increased gradually. In an embodiment, the elastic actuator comprises a spring and a ball. In an embodiment, the elastic actuator is a spring plunger. In an embodiment, the elastic actuator is a radiused end post.

An embodiment of the disclosure is a method of activating a flapper check valve wherein the elastic actuator causes the flapper to default to the closed position when the flow ceases.

An embodiment of this disclosure is a novel flapper check valve apparatus. A further embodiment is a novel method of activation of a flapper check valve. In an embodiment, the apparatus comprises a tubular body, a flapper with an ability to pivotally moving around the tubular body, and an elastic actuator. In an embodiment, the flapper is activated by the compressed elastic actuator, which has an ability to bias the flapper into a close position when a flow is stopped.

In some embodiments, the tubular body comprises a radially outwardly extending annular valve seat formed thereon, the annular valve seat comprises a cavity being parallel to an axis of the tubular body to accommodate the elastic actuator. In an embodiment, the flapper comprises a cam having a cam profile.

In some embodiments, the apparatus further comprises a hinge pin placed through the cam and the annular valve seat comprises two ears to couple the hinge pin. In an embodiment, the elastic actuator urges the cam to bias the flapper from an open position into the closed position. In an embodiment, when the flapper is in the closed position, the elastic actuator contacts the cam profile at a first point. In an embodiment, the radius of the first point is the smallest radius on the cam profile. In an embodiment, when the flapper is on the open position, the elastic actuator contacts the cam profile at a second point. In an embodiment, the radius of the second point is the largest radius on the cam profile. In an embodiment, radii on the cam profile from the first point to the second point are increased gradually. In an embodiment, the elastic actuator comprises a spring and a ball. In an embodiment, the elastic actuator is a spring plunger or a radiused end post.

An additional embodiment of this disclosure comprises a novel method of activation of a flapper check valve. In this embodiment, a compression spring acts on a ball bearing which further acts on a cam profile on the back of a flapper. In an embodiment, the flapper is the gate which opens in one direction of flow and is forced to close when the flow attempts to move in the opposite direction. In an embodiment, a ball is placed on top of the spring, and the flapper is pressed down to preload the spring and as the flapper is opened by fluid flow, the cam pushes on the ball which further compresses the spring causing a greater moment on the flapper, allowing it to close again when fluid flow ceases. In an embodiment, the increasing force on the flapper as it opens allows the flapper to close in any orientation even when gravity is acting against the flapper's movement to the closed position.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3$^{rd}$ Edition.

Figure 1:
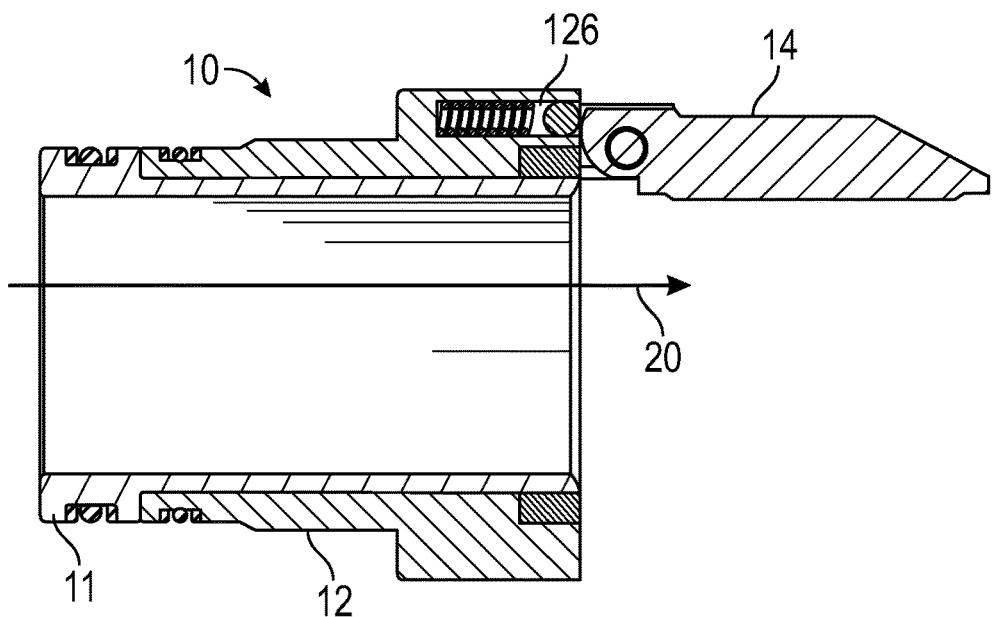
FIG. 1 depicts a side cross section view of a valve with flapper open.
Figure 3:
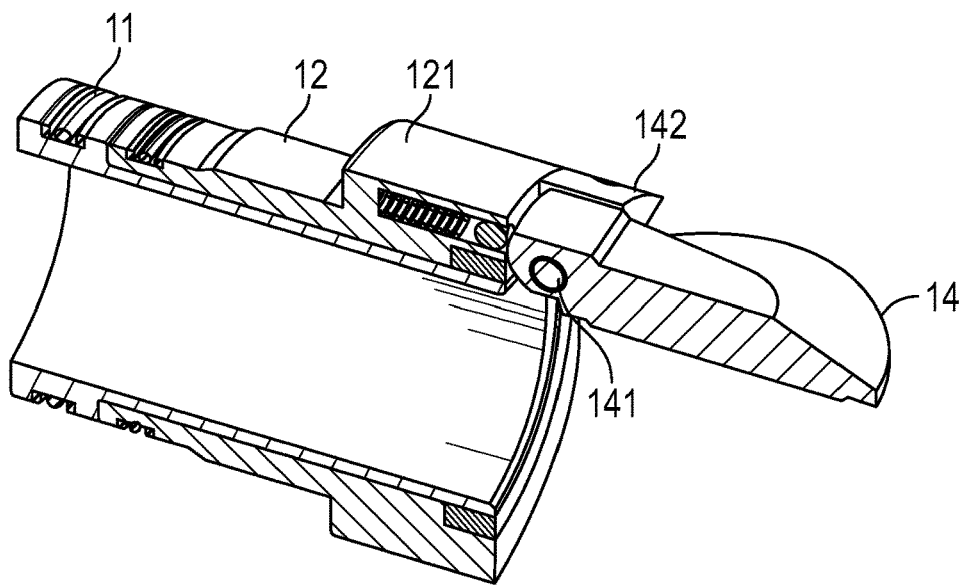
FIG. 3 depicts a prospective view of a cross section of the valve in FIG. 1.

FIGS. 1 and 3 illustrate an embodiment of a flapper check valve of the present disclosure. The flapper check valve 10 includes a tubular body 12 which is preferably substantially formed of metal, such as 420 modified or nickel Alloy. The tubular body 12 has an inner diameter which is substantially the same as an outer diameter of the associated pipe 11. The inner surface of the tubular body 12 has threads (not shown) to engage with corresponding threads (not shown) of the pipe 11. The fluid flow 20 in the pipe 11 can urge the flapper 14 open. An elastic actuator 126 is present adjacent to flapper 14. This configuration is exemplary, and it is to be understood that alternate configurations are possible.

The outer end of the tubular body 12 has a radially outwardly extending annular valve seat 121 (FIG. 2) formed thereon.

Figure 2:
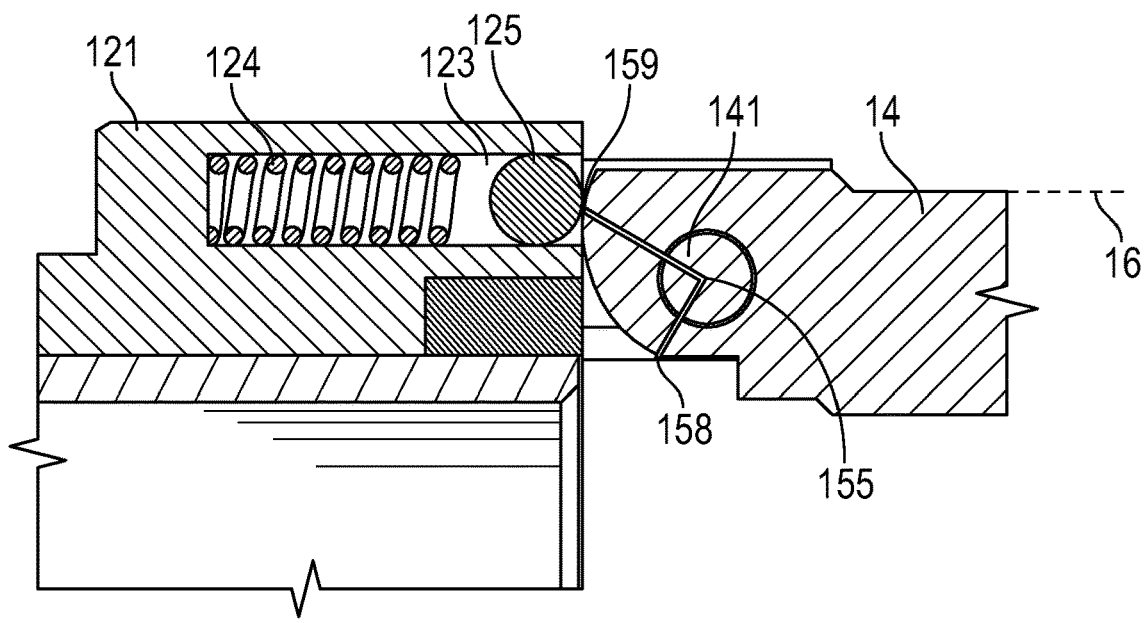
FIG. 2 depicts a side cross section view of a valve with a spring.

In FIG. 2, the annular valve seat 121 has a cavity 123 along the axis of the tubular body 12 (FIG. 1) to accommodate an elastic actuator 126 (FIG. 1). The cavity 123 is offset from the hinge pin 141 and the elastic actuator 126 (FIG. 1) can exert force on the cam section 145 (FIG. 7) causing the flapper 14 to move to a closed position.

In FIG. 2, the elastic actuator 126 includes a compression spring 124 and a ball 125.

Figure 4:
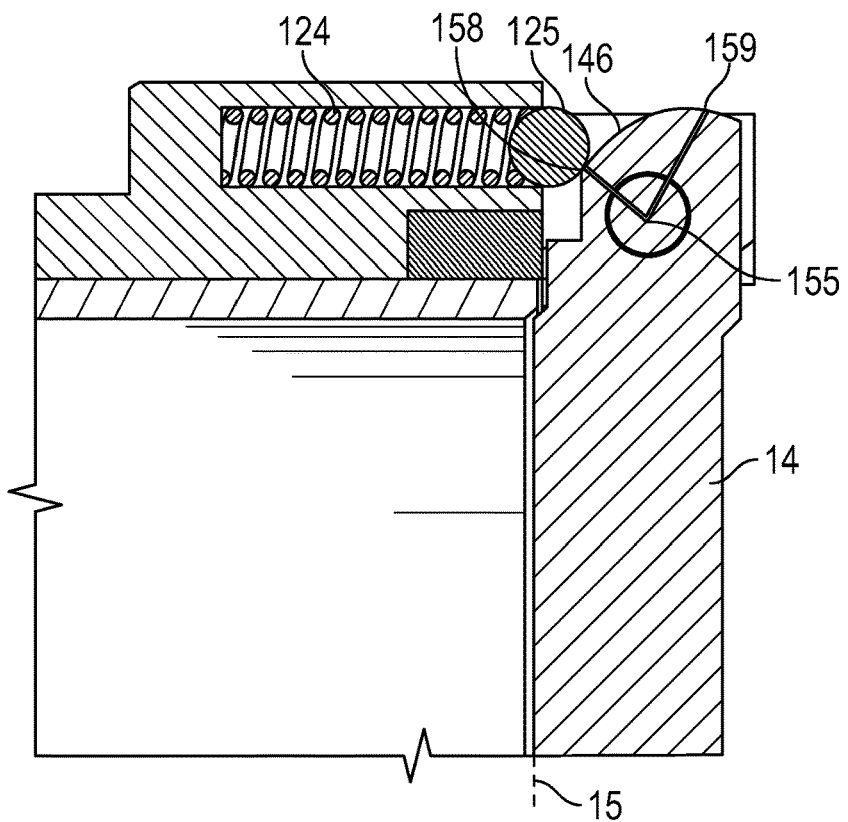
FIG. 4 depicts a side cross section view of a valve with flapper closed.

In FIG. 4, the compressed compression spring 124 acts on the ball 125 which further acts on the cam profile 146 on the back of the flapper 14.

Figure 5:
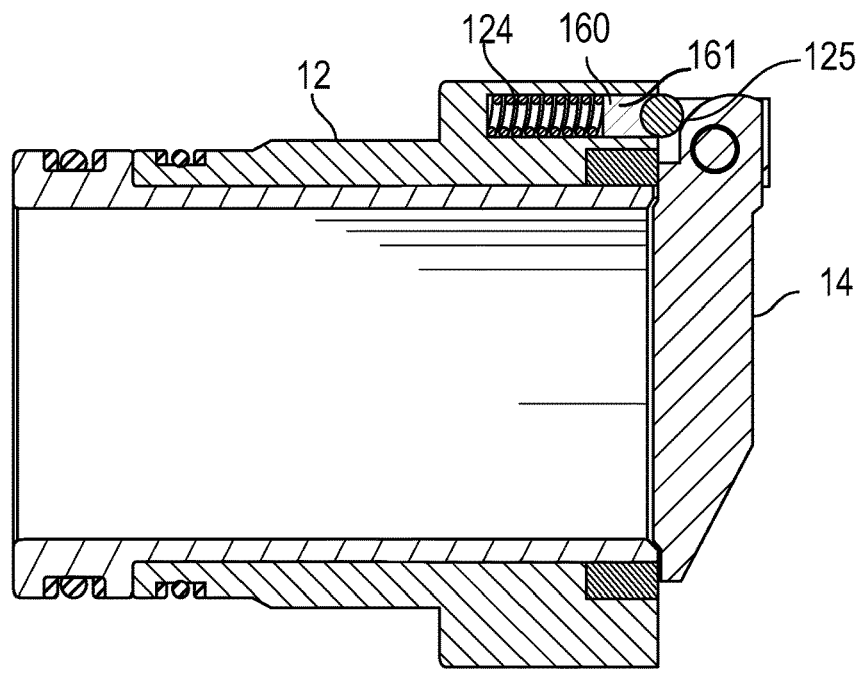
FIG. 5 depicts a side cross section view of a valve with the flapper closed.

In FIG. 5, the compressed compression spring 124 acts on a spring plunger 160 or a radiused end post 161, which act on the ball 125, which further acts on the cam profile on the back of the flapper 14.

Figure 6:
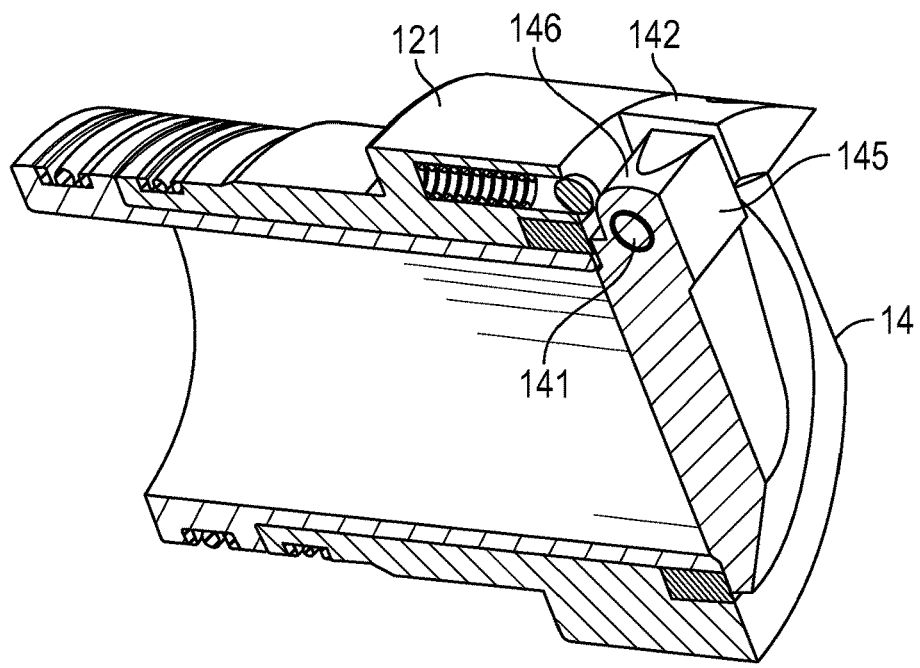
FIG. 6 depicts a prospective view of the valve in FIG. 5.

In FIG. 6, the cam section 145 includes a cam profile 146 contacting the ball 125 (FIG. 4).

Figure 7:
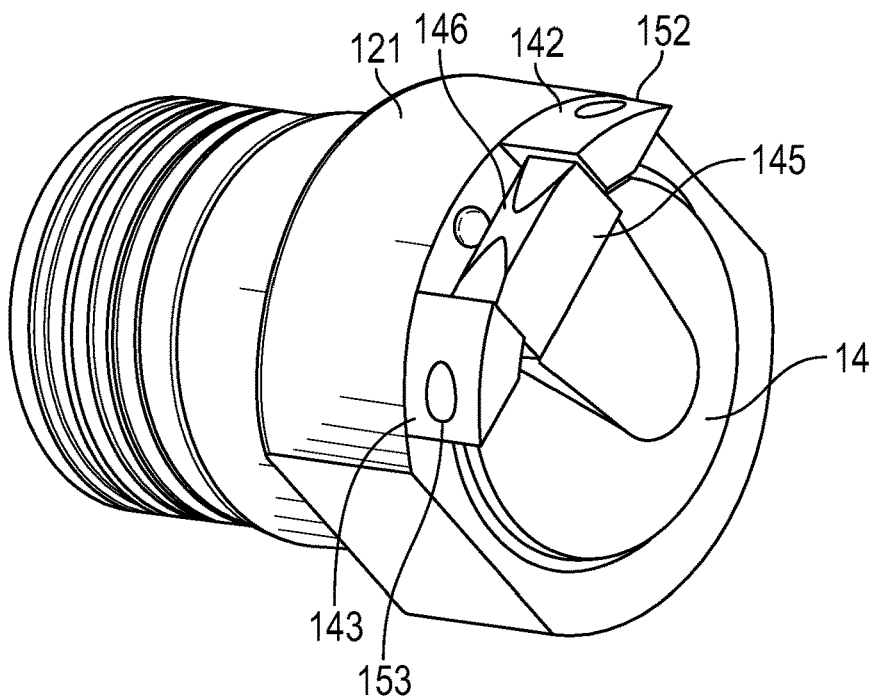
FIG. 7 depicts a prospective front view a valve with the flapper closed.

FIG. 7 depicts two ears 142, 143 formed on the outer top end of the valve seat 121 at a predetermined interval. The ears 142, 143 have hinge pin holes 152, 153 respectively. FIG. 3 depicts ear 142. The hinge pin hole 152 aligns with the hinge pin hole 153 such that a hinge pin 141 (FIG. 3) can be inserted therein. A flapper 14 comprises a cam section 145 coupling to the hinge pin 141 such that the flapper 14 can move pivotally with the hinge pin 141 (FIG. 9).

Referring to FIGS. 2 and 4, the hinge pin 141 has a center 155, the distance between the center 155 and any point on the cam profile 146 is called a radius of the point. When the flapper 14 is in the closed position 15, a first point 158 on the cam profile 146 contacts with the ball 125. When the flapper 14 is on the open position 16, a second point 159 on the cam profile 146 contacts with the ball 125, the radius of the second point 159 is larger than the radius of the first point 158. From point 158 to point 159, the radii are increased gradually.

Figure 8:
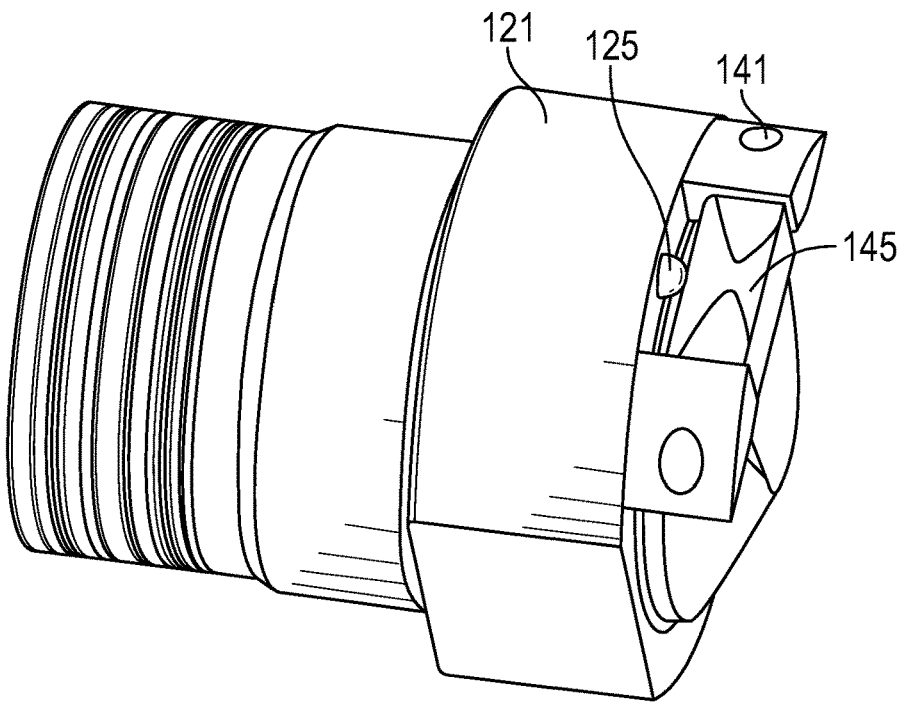
FIG. 8 depicts a prospective view from above a valve with the flapper closed.

Referring to FIGS. 4 and 8, as the flapper is closed, the flapper 14 is in the closed position 15, a first point 158 on the cam profile 146 contacts with the ball 125, the radius of the first point 158 is the smallest radius on the cam profile 146. In this case, the compression spring 124 urges the ball 125 to move out to against the cam profile 146 such that the stroke of the compression spring 124 is longest.

Figure 9:
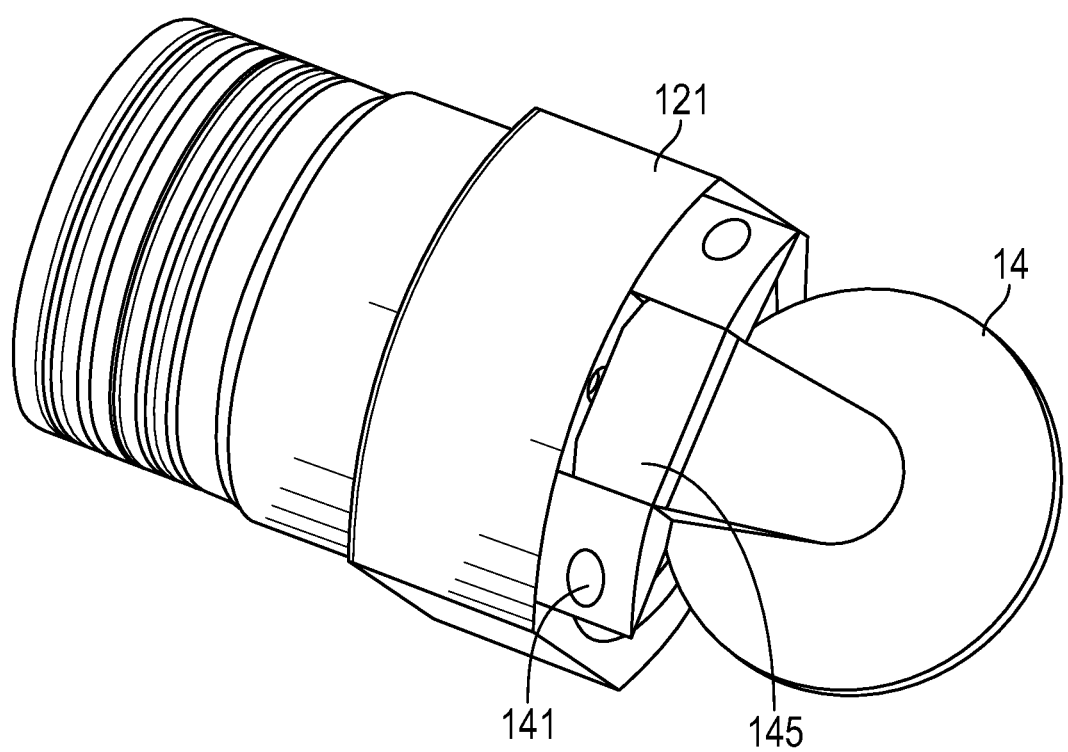
FIG. 9 depicts a prospective view from above a valve with the flapper open.

Referring to FIGS. 2 and 9, as the flapper is opened by fluid flow 20, the flapper 14 pivots around the hinge pin 141 from the closed position 15 to the open position 16. In this scenario, the radii are increased from the first point 158 to the second point 159 and the cam 145 pushes on the ball which further compresses the compression spring. When the flapper 14 is in the closed position 15, the stroke of the compression spring 124 is shortest and the compression spring 124 stores maximum potential energy which causes a greater moment on the flapper 14 allowing it to close again when fluid flow 20 ceases. The increasing force on the flapper as it opens allows the flapper to close in any orientation even when gravity is acting against the flapper's movement to the closed position.

In some embodiments, the elastic actuator can be a spring plunger or radiused end post in which the spring acts on to actuate the flapper.

The advantage of the compression spring is that it is more robust than current methods of actuating the flapper. With a compression spring, there is more provision for space to allow for an embodiment which has lower operating stresses on the spring. In the compression spring embodiment, the compression spring is used along with a specific radiused cam profile on the flapper in order to properly actuate it. In comparison to existing solutions, the disclosed embodiment is more robust and has a much higher probability of functioning without failure in between service intervals. The compression spring is less stressed while providing equivalent torque on the flapper. The embodiment having a compression spring is an advance over current solutions. The compression spring feature has also resulted in a specific element to the flapper allowing the force from the spring to cause torque around the hinge mechanism of the flapper. The specific cam profile on the flapper is an additional distinguishing feature of the flapper.

A method of activating a check valve utilizes an apparatus wherein a compression spring acts on a ball bearing which further acts on a cam profile on the back of a flapper. The flapper is the gate which opens in one direction of flow and is forced to close when flow attempts move in the opposite direction. The spring actuation guarantees the flapper will default to the closed position when flow is stopped. Furthermore, the spring guarantees that the flapper will close for any orientation that the valve may be in. When the apparatus is assembled, the spring is placed into a cavity which is offset from the pivot point of the flapper hinge. A ball is placed on top of the spring, and the flapper is pressed down to preload the spring. A pin is placed through the pivot point of the flapper body to create a hinge. As the flapper is opened by fluid flow, the cam pushes on the ball which further compresses the spring causing a greater moment on the flapper allowing it to close again when fluid flow ceases.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. A flapper check valve apparatus comprising:
   a tubular body having an interior flow channel; a flapper pivotally movable around the tubular body, and an elastic actuator adjacent to the flapper; wherein the flapper is activated by the elastic actuator, which biases the flapper into a closed position when a flow is stopped; and
   wherein the tubular body comprises a radially outwardly extending annular valve seat formed thereon; and
   wherein the annular valve seat comprises a cavity on an upstream side of the flapper parallel to an axis of the tubular body which accommodates the elastic actuator; and
   wherein the flapper comprises a cam having a cam profile and a hinge pin placed through the cam; and
   wherein the elastic actuator urges the cam to bias the flapper from an open position into the close position; and
   wherein when the flapper is in the closed position, the elastic actuator contacts the cam profile at a first point, with a radius of the first point being a smallest radius on the cam profile; and
   wherein when the flapper is in the open position, the elastic actuator contacts the cam profile at a second point, with a radius of a second point being larger than the radius of the first point; and wherein the elastic actuator is exterior of the interior flow channel of the tubular body.

2. The apparatus of claim 1, wherein the annular valve seat comprises two ears to couple the hinge pin.

3. The apparatus of claim 1, wherein radii on the cam profile from the first point to the second point are increased gradually.

4. A method of activating a flapper check valve of claim 1, wherein the elastic actuator causes the flapper to default to the closed position when the flow ceases.

* * * * *